(12) United States Patent
Mukerjee et al.

(10) Patent No.: US 6,584,317 B2
(45) Date of Patent: *Jun. 24, 2003

(54) CONCURRENT RINGING ON MULTIPLE NETWORK TELEPHONES

(75) Inventors: Sandip Mukerjee, Warren, NJ (US); Louis Michael Taff, Old Bridge, NJ (US); Richard Zaffino, Kirkland, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/123,466

(22) Filed: Apr. 15, 2002

(65) Prior Publication Data

US 2002/0160780 A1 Oct. 31, 2002

Related U.S. Application Data

(63) Continuation of application No. 08/669,805, filed on Jun. 27, 1996, now Pat. No. 6,405,041.

(51) Int. Cl.[7] .................................................. H04Q 7/20
(52) U.S. Cl. ........................ 455/445; 455/414; 455/461; 455/560
(58) Field of Search ................................. 455/414, 416, 455/417, 433, 445, 461, 560, 561; 370/280; 379/202, 211, 167

(56) References Cited

U.S. PATENT DOCUMENTS

| 5,103,448 A | 4/1992 | Barnes et al. |
| 5,127,042 A | 6/1992 | Gillig et al. |
| 5,454,032 A | 9/1995 | Pinard et al. |
| 5,502,757 A | 3/1996 | Bales et al. |
| 5,502,762 A | 3/1996 | Andrew et al. |
| 5,548,636 A | 8/1996 | Bannister et al. |
| 5,802,160 A | 9/1998 | Kugell et al. |
| 5,956,631 A | 9/1999 | Gerszberg et al. |

FOREIGN PATENT DOCUMENTS

| EP | 0549126 | 6/1993 |
| GB | 2293521 | 3/1996 |

OTHER PUBLICATIONS

*Communications Daily*, Nov. 20, 1992.
*Comcast Connections*, Issue 7, vol. 6, Summer 1996, Section entitled "Direct Link, One Number Service to Launch in Sep."
U.S. Patent Application Ser. No. 08/175,659, filed Dec. 30, 1993, "Multiple Terminal Device Ringing in Telephone Communications Systems."

*Primary Examiner*—Lester G. Kincaid
(74) *Attorney, Agent, or Firm*—Klarquist Sparkman, LLP

(57) ABSTRACT

A system and method for concurrently ringing a subscriber's wired and mobile stations, where the wired station is served by a wired telecommunications network and the mobile station is served by a wireless telecommunications network. The call is routed to a network interface point of control from either the wired or wireless networks and the network interface becomes the point of control for the call. The call is initially offered to the mobile station by the network interface point of control, and before the mobile station rings, the call is offered to the wired station so that the wired and mobile stations ring concurrently.

31 Claims, 7 Drawing Sheets

CONCURRENT RINGING ON MULTIPLE NETWORK TELEPHONES

This application is a continuation of U.S. patent application Ser. No. 08/669,805, filed Jun. 27, 1996, now U.S. Pat. No. 6,405,041 the disclosure of which is hereby incorporated by reference herein.

BACKGROUND OF THE INVENTION

1. Field of the Invention

The present invention relates to telecommunication systems and, more particularly, to an apparatus and a method for ringing a subscriber's wired and wireless mobile stations concurrently based upon a call to that particular subscriber's published number.

2. Description of the Related Art

With the increasing popularity of wireless telecommunication systems (i.e, wireless cellular telephone systems), telecommunication service providers offer many different types of telecommunication services to their respective customers. Such services are generally provided to users on a subscription basis and, therefore, these users are generally referred to as "subscribers."

Quite often, subscribers may have multiple telephones or stations at which they may be reached, such as a wired station at home or in the office and a wireless station. Accordingly, one category of telecommunication services offered to subscribers having multiple stations—a wired station (i.e., a wired telephone) served by a wired telecommunications network and a wireless station (i.e., a mobile station) served by a wireless telecommunications network—is to sequentially ring the wired and wireless stations upon the placement of a call to that particular subscriber's published number.

A known method for providing such a call delivery service is to ring the subscriber's wired and wireless stations sequentially. As illustrated in FIG. 1 for instance, when a call is placed to a subscriber's published number, the call is routed to an end office or private branch exchange (PBX) 140 within the wired telecommunications network. The end office or PBX 140 causes the subscriber's wired station 150 to initially ring and, if there is no answer on the wired station 150, the call is forwarded from the end office or PBX 140 in the wired telecommunications network to the wireless telecommunications network 130 to thereafter ring the subscriber's wireless station 170.

Unfortunately, when the call is not initially answered by the subscriber at the wired station 150 according to this known method of call delivery, the calling party initiating the call to the subscriber may experience a delay between the ringing of the wired station and that of the wireless station. Additionally, as a result of forwarding the call to ring wireless station 170 in a different network 130, the calling party may also experience a prolonged ring time. As a result of such prolonged ring time, callers may have a tendency to abandon the call when the call at the first rung station 150 goes unanswered and before the call is transferred to and/or rings at the second station 170.

Accordingly, a call delivery method that rings the subscriber's wired and wireless stations 150, 170 concurrently is desirable. The term "concurrently" is used herein to mean more or less at the same time, and is not limited to necessarily ringing the stations synchronously with identical periods and duty cycles (on-time and off-time).

As illustrated in FIG. 1, however, such concurrent ringing of the subscriber's wired and wireless stations 150, 170 is problematic because there are two different networks involved with the wired and wireless stations (e.g., the wired telecommunication network and the wireless telecommunication network 130) and these networks do not presently coordinate the interaction necessary to ring stations on both networks concurrently. It has also been difficult to concurrently ring a subscriber's wired and wireless stations because the call set-up time for a wireless station is generally longer than that for a wired station.

SUMMARY OF THE INVENTION

In accordance with the present invention, a system and method are provided for concurrently ringing a subscriber's wired and mobile stations, where the wired station is served by a wired telecommunications network and the mobile station is served by a wireless telecommunications network.

In an advantageous embodiment of the present invention, the call is routed to a network interface point of control from either the wired or wireless networks and the network interface becomes the point of control for the call. The call is initially offered to the mobile station by the network interface, and before the mobile station is rung, the call is offered to the wired station so that the wired and mobile stations ring concurrently.

BRIEF DESCRIPTION OF THE DRAWINGS

The foregoing features and other aspects of the invention are explained in the following description taken in connection with the accompanying drawings wherein.

DETAILED DESCRIPTION

Figure 1:
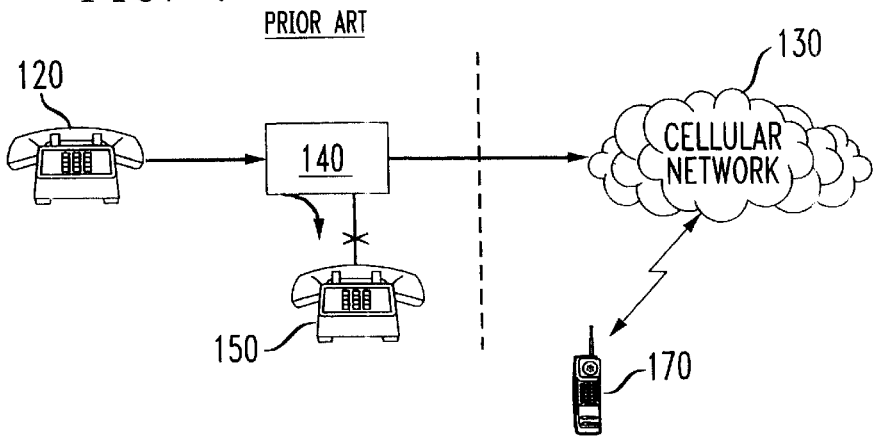
FIG. 1 is a schematic illustrating traditional call forwarding from a wired telecommunication network when a call to a subscriber's wired station goes unanswered to a wireless telecommunication network for ringing the subscriber's wireless station.
Figure 2:
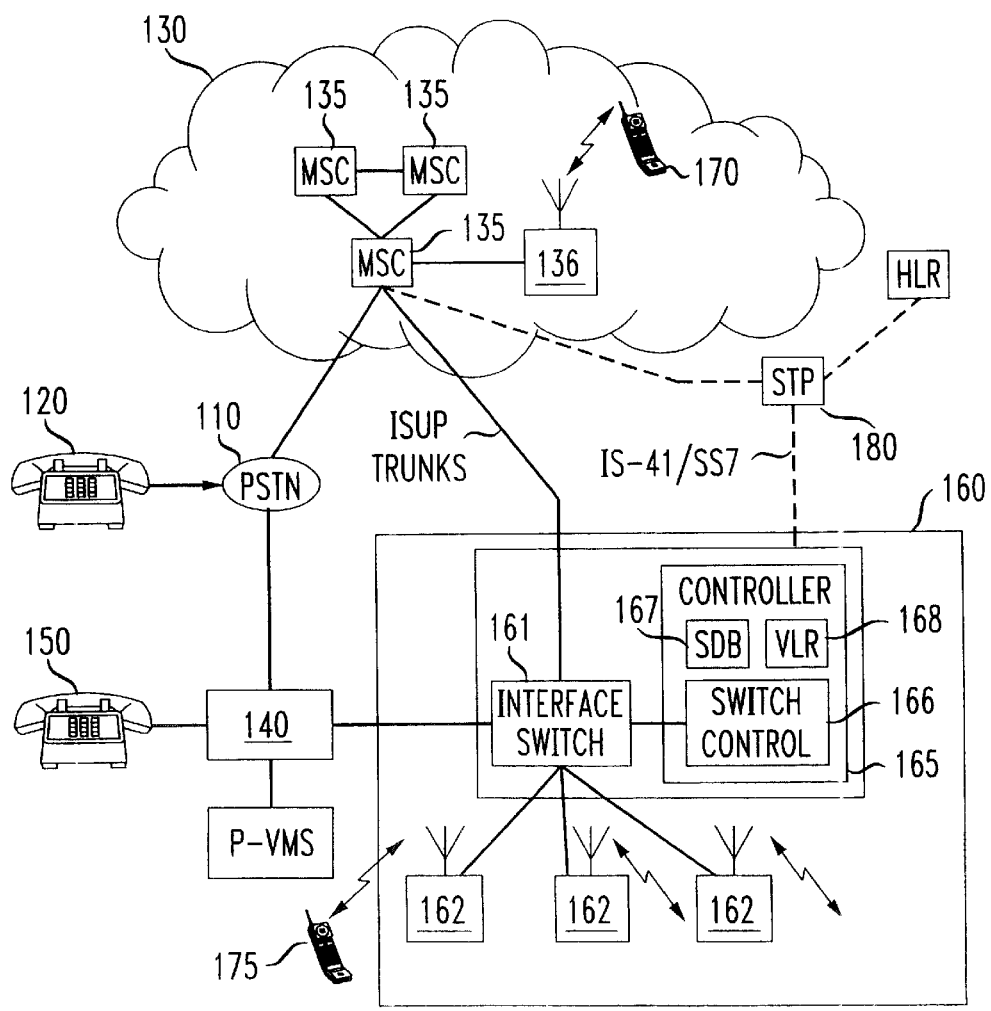
FIG. 2 is a schematic illustrating a telecommunications system capable of concurrently ringing a subscriber's wired station and wireless station according to the present invention.

A telecommunications system for concurrently ringing a subscriber's wired station 150 and wireless station 170 and/or 175 according to the present invention is illustrated in FIG. 2. It is understood that the service provider for the wired and wireless networks need not be the same entity and, furthermore, that their respective switches and databases need not share common intelligence and/or data, that is, they need not "know" about one another.

A wired telecommunications network 110, such as the Public Switched Telephone Network (PSTN), generally comprises a plurality of conventional switches that are interconnected to enable originating station 120 from which a call is placed to communicate with other stations within or outside PSTN 110. The originating station 120 illustrated in FIG. 2 may be a conventional telephone or any other communication device connected to PSTN 110.

A wireless telecommunications network 130, such as the Public Cellular Network, generally comprises a plurality of Mobile Switching Centers (MSC) 135 (also known as Mobile Telephone Switching Offices (MTSO)) that are connected to one another (directly or via PSTN 110). MSC 135 is in communication with and operates to process calls (e.g., switching, handing off, terminating, originating, signalling, etc.) involving at least one mobile station 170. The mobile station 170 may be a conventional mobile cellular telephone or another type of wireless communication device.

Although the wireless telecommunications network 130 need not be limited to cellular networks, conventional cellular technology may be utilized to allow the same frequencies of a common allocated radio bandwidth to be reused in separated local areas or cells of a broader region. Each cell is served by a base transceiver station 136 comprising a group of local transceivers connected to a common antenna. The base stations 136, each typically comprising a controller and one or more transceiver stations, are interconnected via MSC 135 (which is also connected to PSTN 110). The base station 136 and mobile station 170 communicate via radio connections and the base station 136 is also connected via trunks to carry the voice or data, and control messages between mobile station 170 and MSC 135.

The wireless telecommunication network 130 typically comprises many units that need to communicate signalling information for controlling connections, which signalling information may include call establishment, reestablishment (hand off), disestablishment (tear down) and maintenance (power control and other processes). Such signalling information is typically communicated over channels separate from the channels carrying actual voice or data communications between the customers being connected. Among the units that need to communicate are the mobile station 170, the base station 136 connected by radio to the mobile station 170, MSC 135, and the various databases that are consulted for the establishment, maintenance and control of mobile calls (including the home location register (HLR), the visitor location register (VLR) and the authentication center (AC)).

The home location register (HLR) contains data for a mobile customer. The data stored in the HLR is the permanent data that is independent of the customer's present location, plus temporary data such as location-related data and the addresses of Service Centers that have stored short messages for a mobile station. These addresses are erased after the short messages have been delivered. The HLR also indicates the Signalling System 7 (SS7) point code or other address for the network element that contains the VLR currently associated with the mobile station.

The VLR contains current data for each mobile customer, including that customer's mobile station's present or most recently known area, the station's on/off status, and security parameters.

As illustrated in FIG. 2, MSC 135 is also connected to PSTN 110 to allow wireless stations 170 of wireless network 130 to communicate with wired stations of PSTN 110, such as telephone 120. While not illustrated, MSC 135 may also be connected to integrated services digital networks (ISDN) for communicating according to the protocols of ISDN.

PSTN 110 is also independently connected to telecommunications switch 140. The switch 140 may be an end office associated with PSTN 110, a PBX connected to PSTN 110, or a known equivalent thereof. Switch 140 is connected to a wired station 150 to allow wired station 150 to communicate with other wired stations (such as originating telephone 120) and/or with wireless stations 170 associated with the wireless network 130.

In an advantageous embodiment of the invention illustrated in FIG. 2, a network interface 160 is provided to facilitate concurrent ringing of a subscriber's wired station 150 and wireless mobile station 170 and/or 175. Preferably, the network interface 160 comprises an interface switch 161 (which is preferably digital) having basic switching functionality, a controller 165 for controlling interface switch 161, and a plurality of base station units 162 for communicating with mobile station 175.

Interface switch 161 is connected to switch 140 and base station units 162, and interface switch 161 is also connected to wireless network 130 in a conventional manner (such as via ISDN (Integrated Services Digital Network) User Part (ISUP) trunks). As such, interface switch 161 is capable of providing switching of voice paths between switch 140, base station units 162 and wireless network 130.

Controller 165 of network interface 160 comprises a switch control 166 connected to and for controlling interface switch 161. Switch control 166 is programmed to determine how to offer/route, set-up or otherwise control calls through interface switch 161. The term "offer" as used herein is intended to mean standard call set-up procedures specific to the interfaces between network interface 160 and switch 140, MSC 135 and/or mobile station 175. Terms that are understood to be generally equivalent to "offering" include routing, delivering or sending a call from one point to another. However, the term "offer" is not intended to be limited to offering the call to only one network element, but includes offering the call to more than one network element such as switch 140 and MSC 135.

In addition, controller 165 of network interface 160 comprises a Subscriber Database (SDB) 167 that functions to identify subscribers subscribing to the service and keeps track of which mobile stations 170, 175 belong to particular subscribers. SDB 167 stores and maintains records for each subscriber, such as the mobile identification number (MIN) for each subscriber's wireless mobile station 170 or 175 and called party identification (CPID) and/or route-to-extension for each subscriber's wired stations 150. The term "CPID" refers to the telephone number dialed by the calling party. The term "route-to-extension" is used herein to describe the telephone number or extension number associated with a subscriber's PBX station or PSTN station.

Controller 165 of network interface 160 her comprises a Visitor Location Register (VLR) 168 that maintains an entry for each user of wireless services within the particular coverage area of network interface 160. That is, VLR 168 contains records for mobile stations currently registered with controller 165. VLR 168 may be similar in design to VLR's that are commonly used in conventional cellular networks. While the information stored in VLR 168 may be varied, the following fields are typical of the information stored in VLR 168 for each new registration:

the user's MIN the mobile electronic serial number (ESN) for the user's wireless station whether the user is a private or public user the Private System Identification (IS-136 PSID) for private users only the user zone the associated PBX extension number for private users only the user's authentication and encryption keys the user's public voice mail indicator the user's private or public voice messaging system (VMS)

the user's public wireless network features (user profile)

VLR 168 of controller 165 preferably communicates with wireless network 130 via conventional IS-41/SS7 (Signalling System 7) signalling through a conventional signal transfer point (STP) 180.

If there is no entry in VLR 168 for a subscriber for an incoming call, then controller 165 will communicate with the broader wireless network to access another VLR where the mobile station 170 or 175 is registered. The controller 165 will then deliver the call over standard trunk interfaces.

Figure 3:
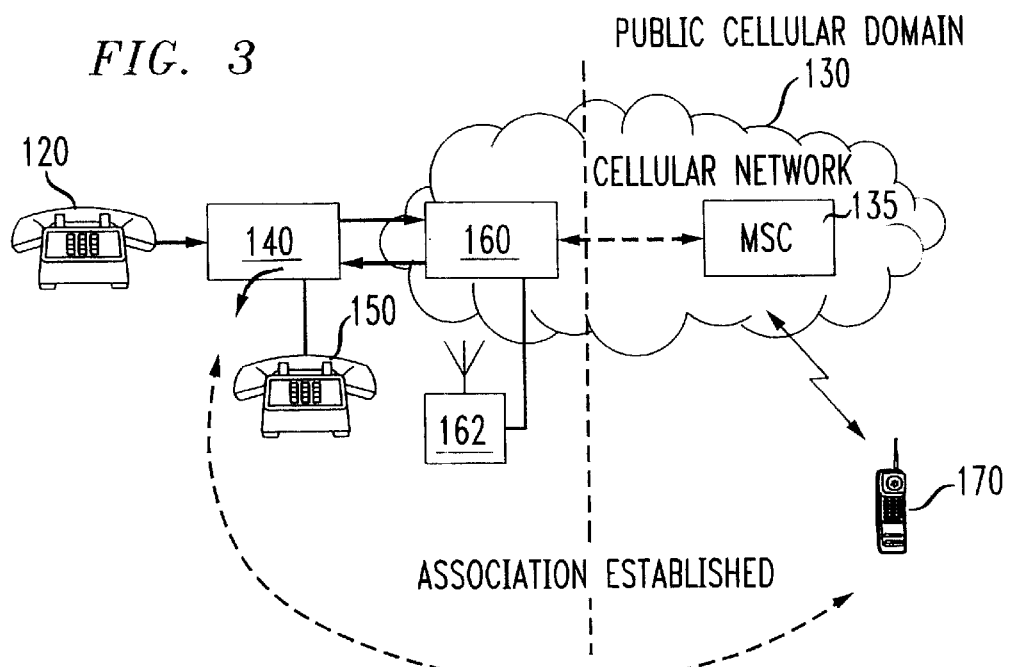
FIGS. 3–6 are schematics illustrating the operation of the system illustrated in FIG. 2.

FIGS. 3–6 illustrate the general operation of an advantageous embodiment of the present invention. In FIG. 3, the subscriber's published number dialed from originating station 120 corresponds to wired station 150 and terminates on switch 140 (which may be an end office, PBX or a known equivalent thereof). As will be discussed below in greater detail, switch 140 routes the call to network interface 160 without ringing wired station 150. Thereafter, network interface 160 acts as point of control for the call. After determining that the dialed number corresponds to a subscriber of the services and identifying the subscriber's MIN via SDB 167, network interface 160 offers/routes the call to MSC 135 in wireless network 130, which will conventionally page (via base station 136) and thereafter instruct mobile station 170 to ring. After a suitable delay T(CR1) corresponding to mobile station ring initiating time $T_1$ (discussed below), network interface 160 also offers/routes the call to switch 140 to ring wired station 150. Accordingly, wired station 150 and mobile station 170 ring concurrently until either station is answered.

Figure 4:
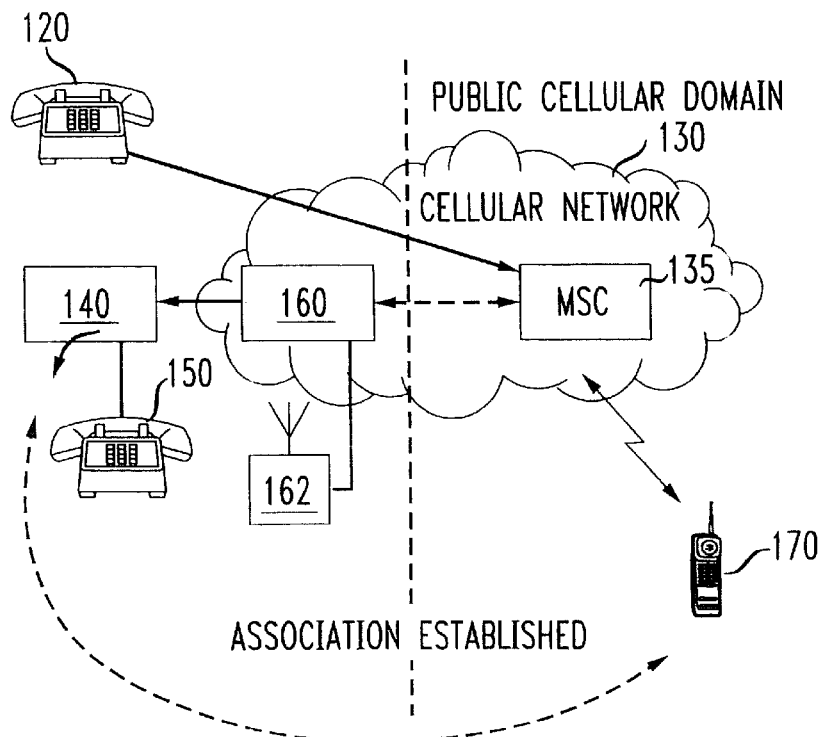

In FIG. 4, the subscriber's published number dialed from originating station 120 corresponds to the MIN associated with mobile station 170 and terminates on MSC 135 in wireless network 130. Like the example illustrated in FIG. 3, the call is routed to network interface 160 to act as point of control for the call. MSC 135 routes the call to network interface 160 without ringing mobile station 170. After determining that the dialed MIN corresponds to a subscriber of the services and identifying the subscriber's CPID and/or route to extension via SDB 167, network interface 160 offers/routes the call to MSC 135 in wireless network 130, which conventionally pages (via base station 136) and thereafter instructs mobile station 170 to ring. After a suitable delay T(CR1) corresponding to mobile station ring initiating time $T_1$ (discussed below), network interface 160 also offers/routes the call to switch 140 to ring wired station 150. Accordingly, wired station 150 and mobile station 170 ring concurrently until either station is answered.

Figure 5:
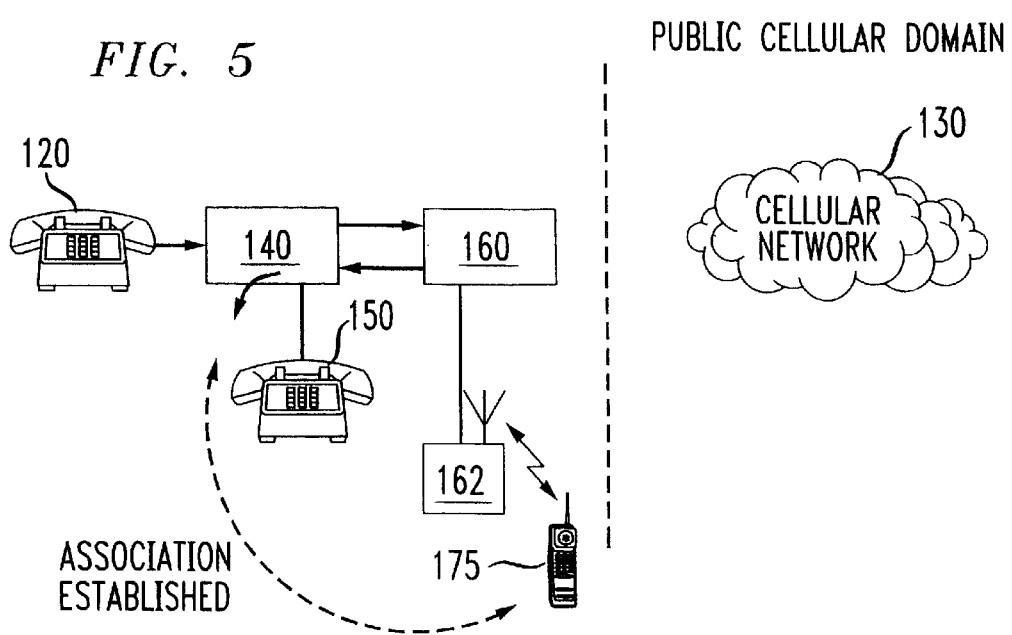

FIG. 5 illustrates another example of the operation of the present invention where the subscriber's dialed number (published number) from originating station 120 corresponds to wired station 150 and terminates on switch 140 (which may be an end office, PBX or a known equivalent thereof). Unlike FIGS. 3 & 4, however, mobile station 175 in FIG. 5 is capable of communicating with base station unit 162 of network interface element 160 in a private domain wireless network controlled by network interface element 160. Here, the operation of the present invention is quite similar to that described above with respect to FIG. 3. Switch 140 routes the call to network interface element 160 without ringing wired station 150 and network interface 160 acts as point of control for the call. After determining that the dialed number corresponds to a subscriber of the services and identifying the subscriber's MIN via SDB 167, network interface 160 pages (via base station unit 162) and thereafter instructs mobile station 175 to ring. After a suitable delay T(CR1) corresponding to mobile station ring initiating time $T_1$ (discussed below), network interface 160 offers/routes the call to switch 140 to ring wired station 150. Accordingly, wired station 150 and mobile station 175 ring concurrently until either station is answered.

Figure 6:
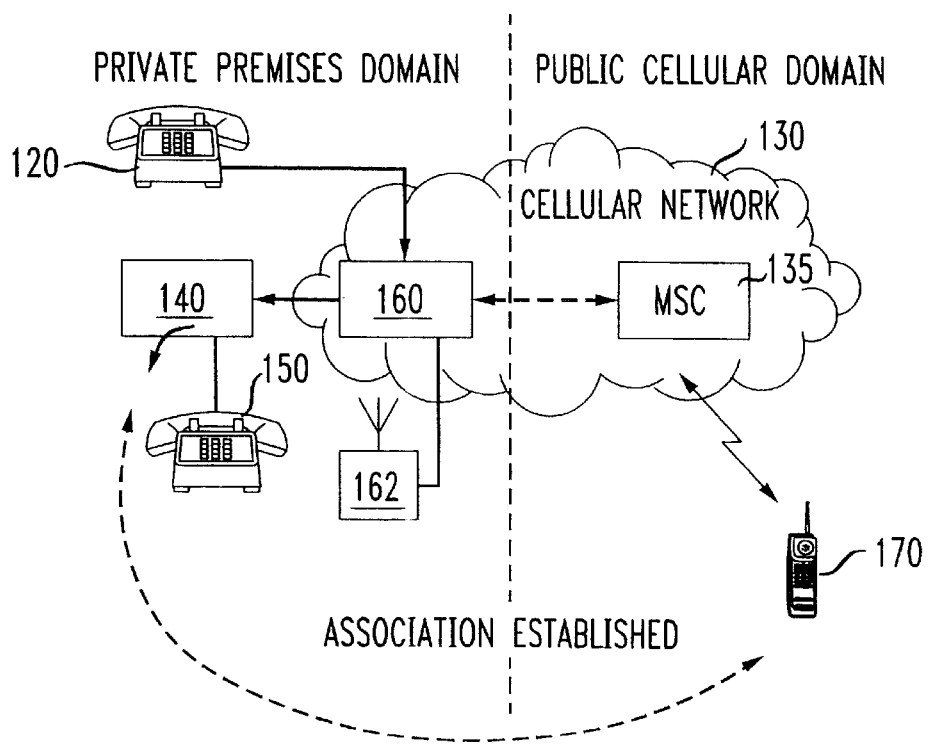

FIG. 6 illustrates an example of the operation of the present invention where the dialed number from originating station 120 terminates at the network interface element 160. Here, network interface element 160 acts as the point of control for the call and, after determining that the dialed number corresponds to a subscriber of the services and identifying the subscriber's MIN and CPID (and route-to-extension) via SDB 167, network interface element 160 offers/routes the call to MSC 135 in wireless network 130, which pages (via base station 136) and thereafter instructs mobile station 170 to ring. After a suitable delay T(CR1) corresponding to mobile station ring initiating time $T_1$ (discussed below), network interface 160 also offers/routes the call to switch 140 to ring wired station 150. Accordingly, wired station 150 and mobile station 170 ring concurrently until either station is answered.

With reference to FIGS. 3–6, it is understood that the present invention is capable of concurrently ringing a subscriber's mobile station 170 and/or 175 and wired station 150 where the published number dialed terminates in an end office or PBX (or known equivalent) 140, MSC 135, or network interface 160. It is also understood that wired station 150 may be part of the public domain PSTN 110 or a private domain PBX. It is further understood that wireless mobile station 170 is capable of communicating with MSC 135 via base station 136 and that wireless mobile station 175 is capable of communicating with base station unit 162 of the network interface element 160.

The operation of an advantageous embodiment of the present invention is illustrated in greater detail in FIGS. 7–10. With reference to FIGS. 7–10, the top row of boxes illustrated in each of the figures represents the functional elements of an advantageous embodiment of the present invention. The vertical axis in FIGS. 7–10 represents time and the horizontal arrows in each figure represent communications between the functional elements.

Figure 7:
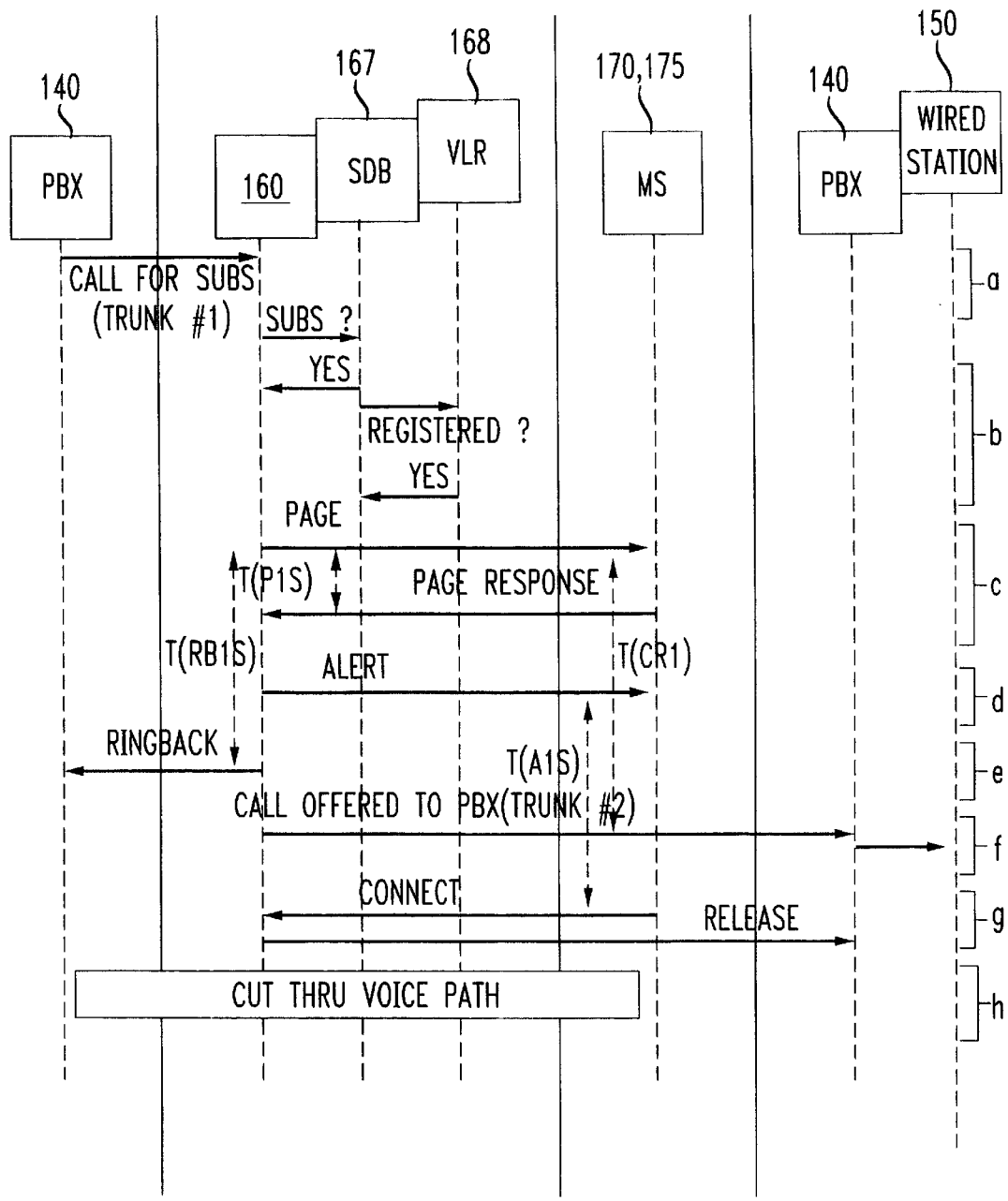
FIGS. 7–10 are flow diagrams of an advantageous method of operation of the system illustrated in FIG. 2.

In the example illustrated in FIG. 7, network interface 160 offers/routes a call to both wired station 150 and either mobile station 170 or 175 so that both stations ring concurrently, and the mobile station 170 or 175 answers first. In this example, switch 140 is a PBX, wired station 150 is a telephone associated with the PBX, and mobile station 170, 175 is a cellular telephone. It is understood, however, that switch 140 could similarly be an end office (or a known equivalent thereof) associated with PSTN 110 and wired station 150 could be a telephone capable of accessing PSTN 110.

An incoming call from originating telephone 120 is routed through PSTN 110 and arrives at switch 140. Switch 140 is programmed to offer/route the call to interface switch 161 to permit network interface 160 to act as point of control of the call. Controller 165 of network interface 160 determines through SDB 167 whether the call is for a subscriber of the service by comparing the dialed number (e.g., MIN, CPID, etc.) to numbers stored in SDB 167 corresponding to subscribers (Step a).

If the dialed number does not correspond to a subscriber stored in SDB 167, then network interface 160 effectively instructs switch 140 to process the call in a conventional manner by delivering the call back to switch 140 or taking other suitable action such as playing an announcement.

However, if the dialed number matches that of a subscriber stored in SDB 167, then controller 165 looks up and retrieves the MIN and/or route-to-extension for the particular subscriber stored in SDB 167. Network interface 160 utilizes the retrieved MIN for the particular subscriber to interact with VLR 168 to determine whether the subscriber is registered in the applicable coverage area (Step b). As discussed above, controller 165 determines through VLR 168 whether the subscriber is registered in the applicable coverage area in a conventional manner.

With reference to FIG. 7, if the subscriber is registered in the applicable coverage area and is therefore present in VLR 168, then network interface 160 pages mobile station 170 or 175, preferably in a manner compatible with the specifications provided in Telecommunications Industry Association TIA-EIA Interim Standard IS-136.1 rev. A and IS-136.2 rev. A, entitled "Dual-Mode Mobile Station Base Station Compatibility Standard" (IS-136), which is incorporated herein by reference (Step c). The page may be accomplished in the private cellular domain through base unit 162 or eventually in the public cellular domain through MSC 135 and base station 136.

At this time, controller 165 of network interface 160 starts the following timers, which are preferably programmed into controller 165:

T(P1S)—expiration of which will denote a no page-response time-out.

T(CR1)—upon expiration of which network interface 160 will offer/route the call to switch 140 connected to wired station 150.

T(RB1S)—upon expiration of which network interface 160 will provide audible ringing to the calling party, such as at originating station 120.

When mobile station 170 responds to the page from network interface 160 before the expiration of the T(P1S) timer, controller 165 cancels the T(P1S) timer, preferably causes mobile station 170 or 175 to become active on a Digital Traffic Channel (preferably in a manner compatible with the specifications provided in IS-136), and instructs mobile station 170 or 175 to alert the subscriber by ringing mobile station 170 or 175 (Step d). A mobile station ring initiating time $T_1$ elapses between paging mobile station 170 or 175 and actually ringing mobile station 170 or 175 (Steps c–d). Mobile station ring initiating time $T_1$ is a delay that is inherent in conventional wireless networks.

At this point, controller 165 starts timer T(A1S), which is also preferably programmed into controller 165. The expiration of timer T(A1S) denotes an alerting time-out to ensure that the mobile station 170 or 175 does not ring forever.

Upon the expiration of timer T(RB1S), controller 165 instructs network interface 160 to provide an audible ringback to the calling party at station 120 (Step e).

Upon the expiration of timer T(CR1), controller 165 instructs network interface 160 to offer/route the call to the switch 140, which switch 140 will then alert the subscriber by ringing wired station 150 (Step f). Timer T(CR1) is set for a period of time estimated to be equivalent to mobile station ring initiating time $T_1$. The delay provided by timer T(CR1) in offering/routing the call to wired station 150, therefore, permits wired station 150 and mobile station 170 or 175 to ring concurrently by taking into account mobile station ring initiating time $T_1$, which is inherent in conventional wireless networks.

If the subscriber answers at mobile station 170 or 175, network interface 160 cancels timer T(A1S), propagates answer supervision toward the calling party at originating station 120, and invokes call release procedures on the outgoing leg of switch 140 to wired station 150 (Step g). Finally, network interface 160 removes the audible ringback and establishes a voice path between mobile station 170 or 175 and originating station 120 (Step h). When either party (calling party or subscriber) terminates the call by hanging up their respective station, all resources are released by the network interface 160.

Figure 8:
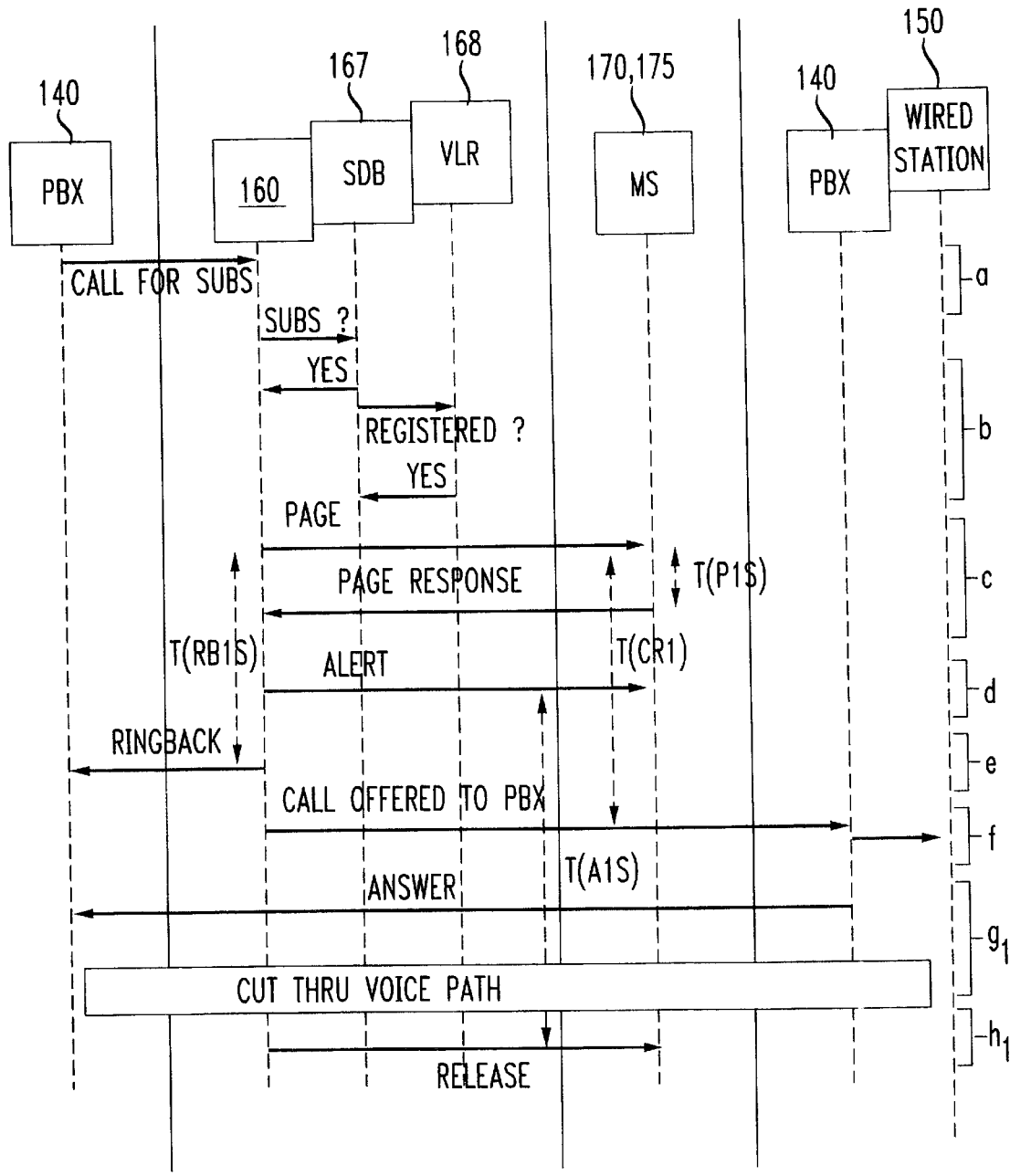

In FIG. 8, the subscriber answers the wired station 150 rather than the mobile station 170, 175. In this circumstance, steps a–f are identical to that described above with respect to FIG. 7. When the subscriber answers at wired station 150, then, upon receiving answer supervision on the outbound leg of switch 140 to wired station 150, network interface 160 terminates the audible ringback provided to the calling party, propagates answer supervision toward the inbound call leg of switch 140 (toward station 120), and cuts through a two-way voice path between the two call legs of switch 140 (Step $g_1$). Thereafter, network interface 160 invokes call release procedures (preferably in a manner that is compatible with the procedures outlined in IS-136) to release the mobile station 170 or 175 leg of the call (Step $h_1$).

Figure 9:
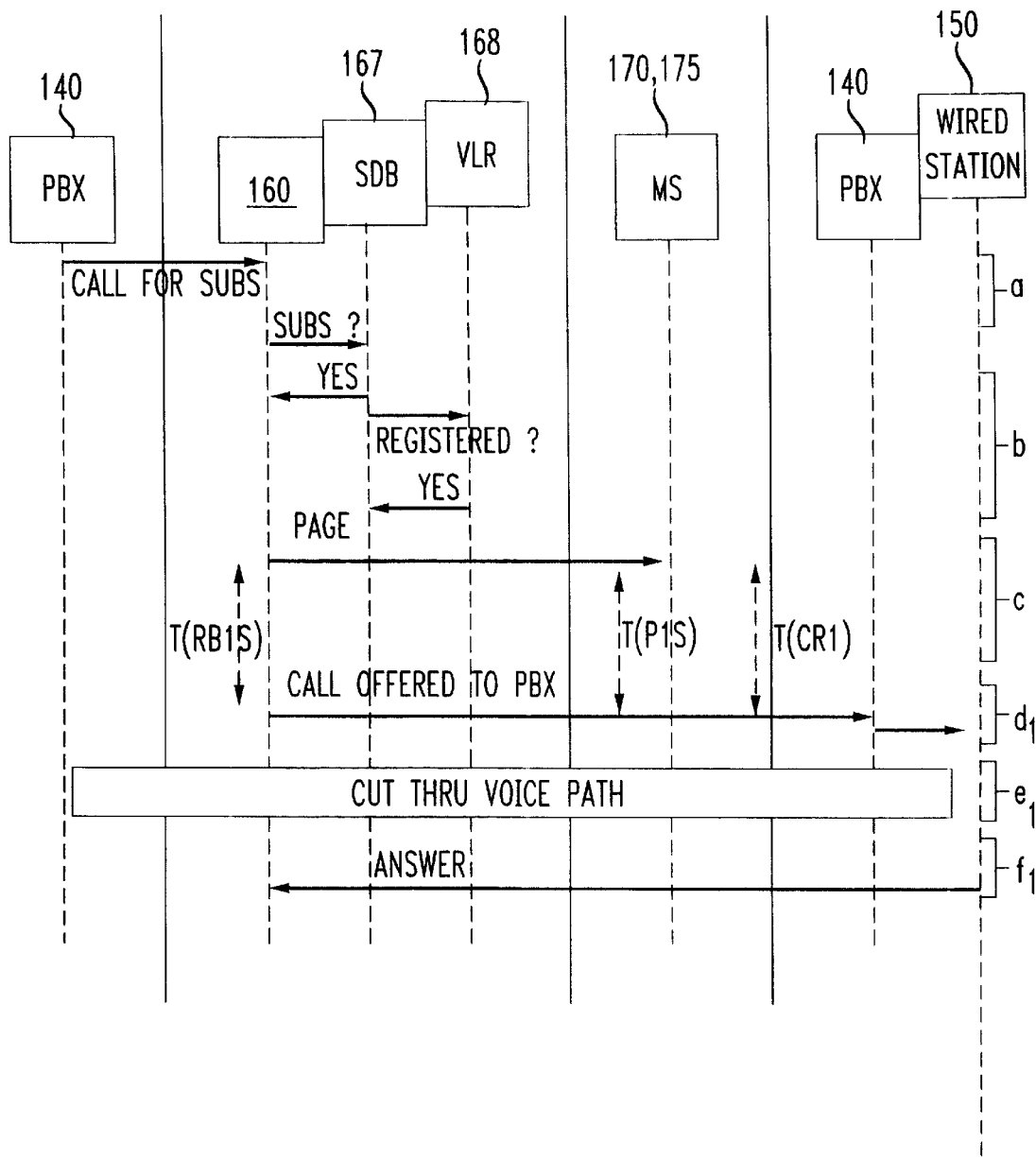

FIG. 9 illustrates the circumstance where network interface 160 does not receive a page-response from mobile station 170 or 175. In this circumstance, steps a–c are identical to that described above with respect to FIG. 7. If network interface 160 does not receive a page-response from mobile station 170 or 175, network interface 160 times out on a page-response timer T(P1S) from mobile station 170, 175 and abandons the call delivery attempt to mobile station 170, 175. That is, upon the expiration of timer T(P1S), network interface 160 cancels the page and other call delivery procedures to mobile station 170, 175, cancels all outstanding timers, and offers the call to switch 140, which in turn alerts wired station 150 (Step $d_1$). At this point, network interface 160 cuts through the voice path between the incoming leg (from station 120) and outgoing leg (to station 150) of switch 140 (Step $e_1$) and, thereafter, preferably receives answer supervision from switch 140 (which is propagated back to the calling party) (Step $f_1$).

Figure 10:
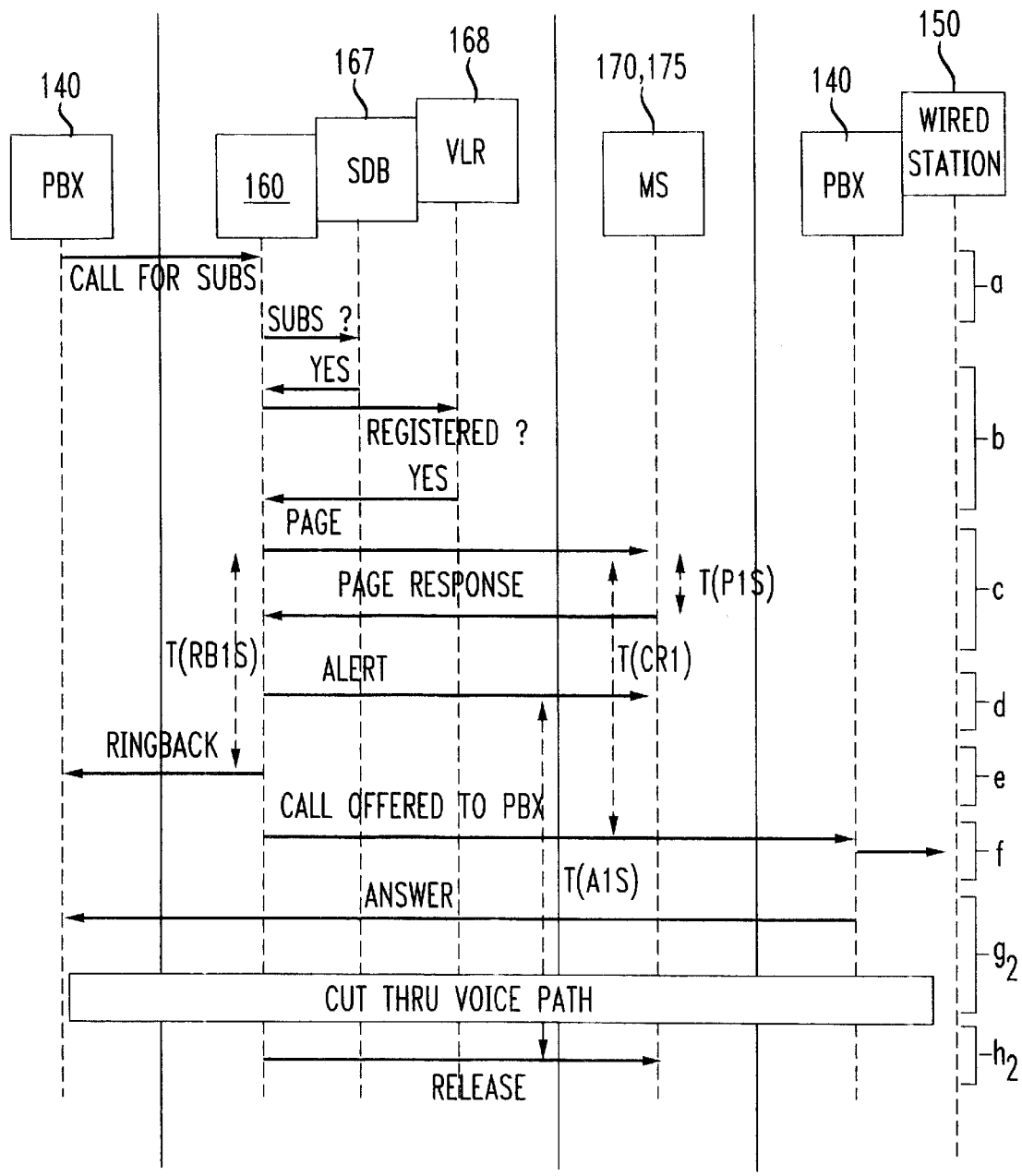

With reference to FIG. 10, should network element 160 not receive a answer indication from mobile station 170 or 175 or wired station 150 within a specified period after alerting mobile station 170 or 175, then network element 160 times out on mobile station 170 or 175. In this circumstance, steps a–f are identical to that described above with respect to FIGS. 7 and 8. However, upon the expiration of timer T(A1S), network element 160 invokes call release procedures (preferably in a manner that is compatible with the procedures outlined in IS-136) to release the mobile station 170, 175 leg of the call (Step $h_2$). In addition, upon receiving answer supervision on the outbound leg of switch 140 to wired station 150, network interface 160 terminates the audible ringback provided to the calling party, propagates answer supervision toward the inbound call leg of switch 140 (toward station 120), and cuts through a two-way voice path between the two call legs of switch 140 (Step $g_2$).

While the timers T(P1S), T(CR1), T(RB1S) and T(A1S) are intended to be adjustable depending upon the particular application provided by the service provider, Table I below enumerates a preferred default setting for each of the above-mentioned timers:

TABLE I

| TIMER | DESCRIPTION | DEFAULT VALUE (SECONDS) |
|---|---|---|
| T(CR1) | Concurrent ring timer in instances when subscriber is registered in the coverage area of network interface element 160 | 10 |
| T(CR1) | Concurrent ring timer in instances when subscriber is not registered in the coverage area of network interface element 160 | 12 |
| T(RB1S) | Ringback timer in instances when subscriber is registered in the coverage area of network interface element 160 | 6 |
| T(RB1S) | Ringback timer in instances when subscriber is not registered in the coverage area of network interface element 160 | 8 |
| T(P1S) | Paging timer in instances where network interface element 160 is attempting to page a subscriber registered in the coverage area of network interface element 160 | 8 |
| T(P1S) | Paging timer in instances where network interface element 160 is attempting to page a subscriber not registered in the coverage area of network interface element 160 | 8 |
| T(A1S) | Alerting timer in instances where network interface element 160 is attempting to alert a subscriber or public user registered in the coverage area of network interface element 160 | 24 |
| T(A1S) | Alerting timer in instances where network interface element 160 is attempting to alert a subscriber registered outside the coverage area of network element interface 160 | 30 |

Although an illustrative and advantageous embodiment has been described herein in detail, it should be noted and will be appreciated by those skilled in the art that numerous variations may be made within the scope of this invention without departing from the principle of this invention and without sacrificing its chief advantages. For example, it is understood that the present invention may also be utilized in a single telecommunications network to concurrently ring multiple stations within that network. It is also understood that the present invention may be utilized to concurrently ring a plurality of wired stations served by one or more wired telecommunications networks or to concurrently ring a plurality of mobile stations served by one or more wireless telecommunications networks. It is further understood that the present invention is not limited to ringing two stations concurrently as described above, but that the invention may be utilized to ring more than two stations concurrently. As such, the terms and expressions have been used herein as terms of description and not terms of limitation. There is no intention to use the terms or expressions to exclude any equivalents of features shown and described or portions thereof and this invention should be defined in accordance with the claims which follow.

We claim:

1. A method of routing a call such that a called party's first station and second station ring concurrently, the method comprising:

(a) routing the call to a network interface point of control;

(b) offering the call from the network interface point of control to the first station; and (c) delaying offering the call from the network interface point of control to the second station for a predetermined time.

2. The method of claim 1, wherein the predetermined period of time corresponds to a ring-initiating time associated with the first station.

3. A telecommunications system for concurrently ringing a plurality of stations upon receiving a call, the telecommunications system comprising:

a network interface point of control connected to the plurality of stations, the network interface point of control offering the call to a first station of the plurality of stations and delaying, for a predetermined period of time, offering the call to a second station of the plurality of stations.

4. The telecommunications system of claim 3 wherein the predetermined period of time corresponds to a ring-initiating time associated with the first station.

5. A network interface point of control within a telecommunications system for concurrently ringing a plurality of called party's stations, comprising:

an interface switch for providing switching of voice paths between stations; and a controller for controlling the interface switch to offer a call to a first station and to delay offering the call to a second station for a predetermined period of time.

6. The network interface point of control of claim 5 wherein the predetermined period of time corresponds to a ring-initiating time associated with the first station.

7. A method of routing a call such that a plurality of stations associated with a called party ring concurrently, the method comprising:

(a) routing the call to a network interface point of control; and (b) offering the call from the network interface point of control to each of the plurality of stations at predetermined different times.

8. The method of claim 7 wherein the offering of calls to each of the plurality of stations is performed at predetermined times according to a ring-initiating time associated with each station.

9. A network controller that controls concurrent ringing of plural communication devices including a wireless communication device and a wired communication device, wherein the network controller delays offering of a call to the wired communication device after offering of the call to the wireless communication device to compensate for an offering time difference between the wired communication device and the wireless communication device.

10. The network controller of claim 9 wherein the network controller includes a timer with a duration related to the offering time difference, and wherein the offering of the call to the wired communication device occurs after expiration of the timer.

11. The network controller of claim 10 wherein the duration of the timer is predetermined.

12. The network controller of claim 9 wherein the offering time difference is based at least in part upon a ring initiating time of the wireless communication device.

13. The network controller of claim 9 wherein the wired communication device is a landline telephone and the wireless communication device is a mobile telephone.

14. The network controller of claim 9 wherein a mobile switching center performs the offering of the call to the wireless communication device, and wherein a network switch performs the offering of the call to the wired communication device.

15. A computer-readable medium storing computer-executable instructions for causing a network interface point of control programmed thereby to perform a method of controlling concurrent ringing of plural communication devices including a wireless communication device and a wired communication device, the method comprising:
 delaying relaying a call to the wired communication device after relaying the call to the wireless communication device to offset a call setup time difference between the wired communication device and the wireless communication device.

16. The computer-readable medium of claim 15 wherein the call setup time difference includes a ring initiating time difference between the wired communication device and the wireless communication device, wherein the delaying includes starting a timer with a duration related to the call setup time difference, and wherein the relaying the call to the wired communication device occurs after expiration of the timer.

17. The computer-readable medium of claim 16 wherein the duration of the timer is predetermined.

18. The computer-readable medium of claim 15 wherein the wired communication device is a landline telephone and the wireless communication device is a mobile telephone, wherein a mobile switching center performs final routing of the call to the wireless communication device, and wherein a network switch performs final routing of the call to the wired communication device.

19. A network controller that controls concurrent ringing of plural communication devices including a wireless communication device and a wired communication device, wherein the network controller delays offering of a call to the wired communication device for a predetermined time after offering of the call to the wireless communication device.

20. The network controller of claim 19 wherein the predetermined time offsets a call setup time difference between the wired communication device and the wireless communication device.

21. The network controller of claim 19 wherein the network controller includes a timer set to the predetermined time, and wherein the offering of the call to the wired communication device occurs after expiration of the timer.

22. The network controller of claim 19 wherein the wired communication device is a landline telephone and the wireless communication device is a mobile telephone, wherein a mobile switching center performs the offering of the call to the wireless communication device, and wherein a network switch performs the offering of the call to the wired communication device.

23. A computer-readable medium storing computer-executable instructions for causing a network computer system programmed thereby to perform a method comprising:
 relaying a call to a wireless communication device;
 delaying relaying the call to a wired communication device to offset a call setup time difference between the wireless communication device and the wired communication device; and
 relaying the call to the wired communication device, whereby the wireless communication device and the wired communication device ring concurrently.

24. The computer-readable medium of claim 23 wherein the call is to a called party, and wherein the method further comprises:
 checking whether the called party subscribes to a concurrent ringing service.

25. The computer-readable medium of claim 23 wherein the delaying includes starting a timer with a predetermined duration related to the call setup time difference, and wherein the relaying of the call to the wired communication device occurs after expiration of the timer.

26. The computer-readable medium of claim 23 wherein the wired communication device is a landline telephone and the wireless communication device is a mobile telephone.

27. A network computer system comprising:
 means for offering a call to a wireless communication device;
 means for delaying offering of the call to a wired communication device to compensate for a ring initiating time of the wireless communication device; and
 means for offering the call to the wired communication device, whereby the wireless communication device and the wired communication device ring concurrently.

28. The network computer system of claim 27 wherein the means for offering the call to the wireless communication device comprises:
 means for paging the wireless communication device; and
 means for, after receiving a page response from the wireless communication device, instructing the wireless communication device to ring.

29. The network computer system of claim 27 wherein the call is to a called party, and wherein the network computer system further comprises:
 means for checking whether the called party subscribes to a concurrent ringing service.

30. The network computer system of claim 27 wherein the means for delaying includes a timer with a duration related to the ring initiating time.

31. The network computer system of claim 27 wherein the wired communication device is a landline telephone and the wireless communication device is a mobile telephone.

* * * * *